United States Patent [19]

Liu

[11] Patent Number: 5,205,045
[45] Date of Patent: Apr. 27, 1993

[54] HOUSEHOLD TILE CUTTING GAUGE

[76] Inventor: Wun-Hui Liu, No. 2, Jiann Guon Lane, Jiunn Guon Li, Taichung, Taiwan

[21] Appl. No.: 864,997

[22] Filed: Apr. 8, 1992

[51] Int. Cl.[5] .......................... B43L 7/12; B43L 13/00
[52] U.S. Cl. ................................ 33/468; 33/DIG. 20; 33/426; 33/472
[58] Field of Search .............. 33/468, 469, 470, 471, 33/472, 473, 418, 419, 421, 464, 465, DIG. 20, 32.1, 32.2, 422, 424, 425, 426, 430, 433, 474, 476, 479, 483, 489, 490, 492, 493, 496, 497

[56] References Cited

U.S. PATENT DOCUMENTS

| | | | |
|---|---|---|---|
| 1,039,901 | 10/1912 | Constantinescu | 33/472 |
| 1,619,091 | 3/1927 | Rieser | 33/DIG. 20 |
| 1,894,886 | 1/1933 | Paskowski | 33/422 |
| 2,423,786 | 7/1947 | Morris | 33/468 |
| 2,435,529 | 2/1948 | Brockley | 33/468 |
| 2,580,263 | 12/1951 | Wooten | 33/32.2 |
| 2,770,043 | 11/1956 | Kwiencinski | 33/DIG. 20 |
| 3,103,747 | 9/1963 | De La Sierra | 33/426 |
| 3,183,598 | 5/1965 | Parr | 33/DIG. 20 |
| 3,718,980 | 3/1973 | Poulos | 33/DIG. 20 |

*Primary Examiner*—William A. Cuchlinski, Jr.
*Assistant Examiner*—C. W. Fulton
*Attorney, Agent, or Firm*—Browdy and Neimark

[57] ABSTRACT

A tile cutting gauge comprises mainly a semi-circular protractor and a guide rod pivotally fastened to the protractor. A length ruler is slidably mounted on the straight side of the protractor, while a baffle means is slidably mounted to the guide rod in such a manner that it can be moved upward, downward, leftward, and rightward. The desired length and angle of the tile intended to be cut are measured respectively by means of the length ruler and the guide rod. The tile intended to be cut is held securely by the length ruler and a baffle means so as to permit an operator to make a cutting mark on the tile along the guide rod.

3 Claims, 5 Drawing Sheets

HOUSEHOLD TILE CUTTING GAUGE

BACKGROUND OF THE INVENTION

The present invention relates to a tile cutting tool, and more particularly to a household tile cutting gauge.

In general, a precision tile cutting machine is used to cut the tile in accordance with specific pre-measured requirements of the building construction. Such expensive tile cutting machine is, of course, not suitable for use in a private home. For a household or a small-scale construction work, a hand shears, such as the one shown in FIG. 3, is used to cut the tile. However, such hand shears is limited in that it can not be used to cut the tile into pieces having sizes conforming precisely to the work requirements, especially in a situation calling for making a bevel cut of the tile.

SUMMARY OF THE INVENTION

It is therefore the primary objective of the present invention to provide a household tile cutting gauge, which can be used in conjunction with a hand shears to cut the tile having a shape consistent precisely with the work requirements.

It is another objective of the present invention to provided a household tile cutting gauge, which can be used to measure simultaneously cutting length and angle of the tile.

In keeping with the principles of the present invention, the objectives of the present invention are accomplished by a household tile cutting gauge, which comprises mainly a semi-circular protractor and a guide rod. It is characterized in that its semi-circular protractor is provided with an arcuate slot extending along its angle marks, a first locking bolt passing through the arcuate slot via the upper end of the guide rod for securing the guide rod, a length ruler disposed on its straight side in such a manner that it can be slided horizontally, and a baffle rod disposed on one end of the guide rod in such a way that it can be slid upward, downward, leftward, and rightward.

The tile intended to be cut is placed between the length ruler and the baffle rod so that the desired cutting length and angle can be measured by means of the length ruler and the guide rod. Furthermore, the guide rod can be used as a guide for a worker to make a cutting mark on the tile intended to be cut.

DETAILED DESCRIPTION OF THE PREFERRED EMBODIMENTS

Figure 1:
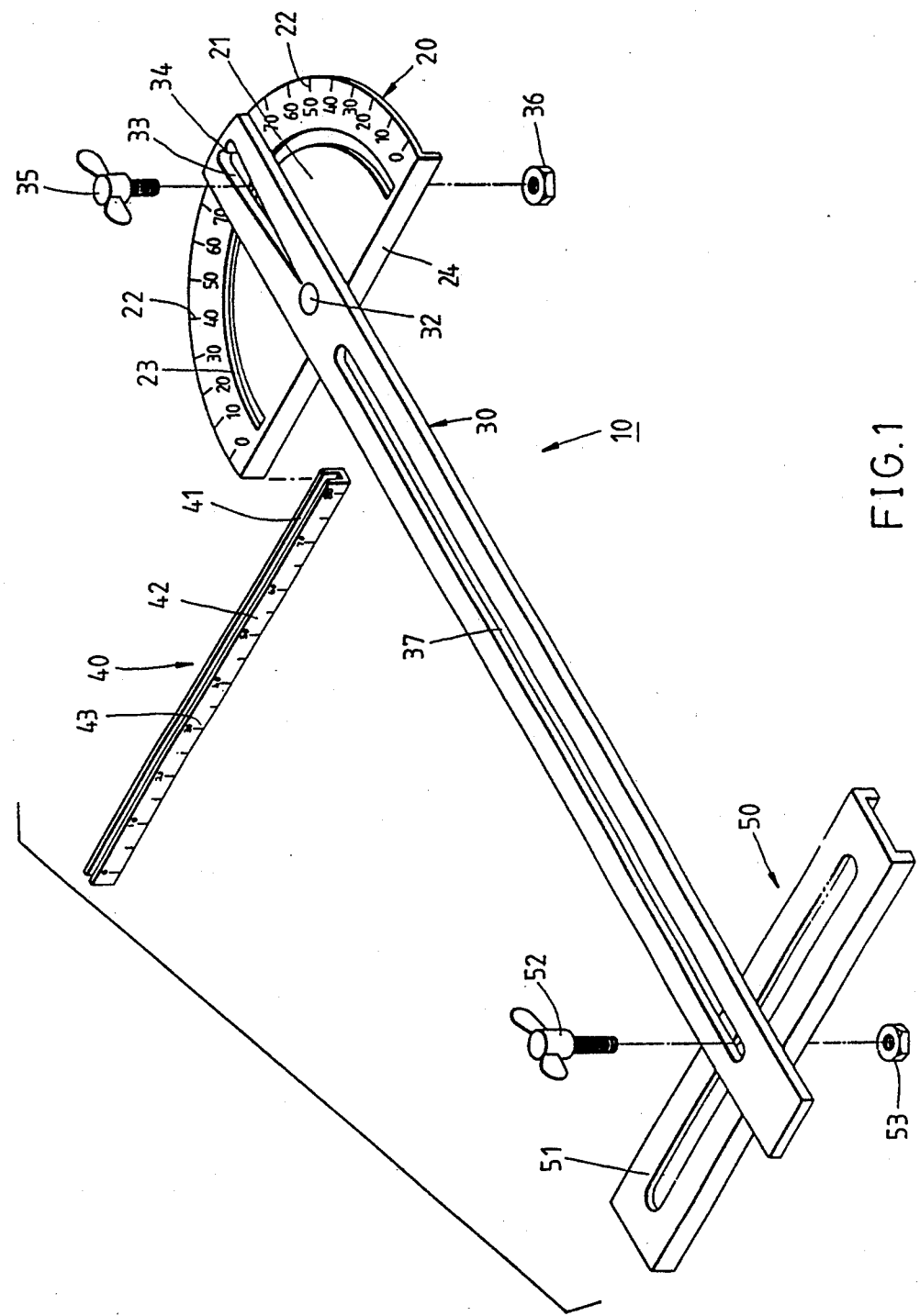
FIG. 1 shows an exploded view of the household tile cutting gauge of the first preferred embodiment of the present invention.
Figure 2:
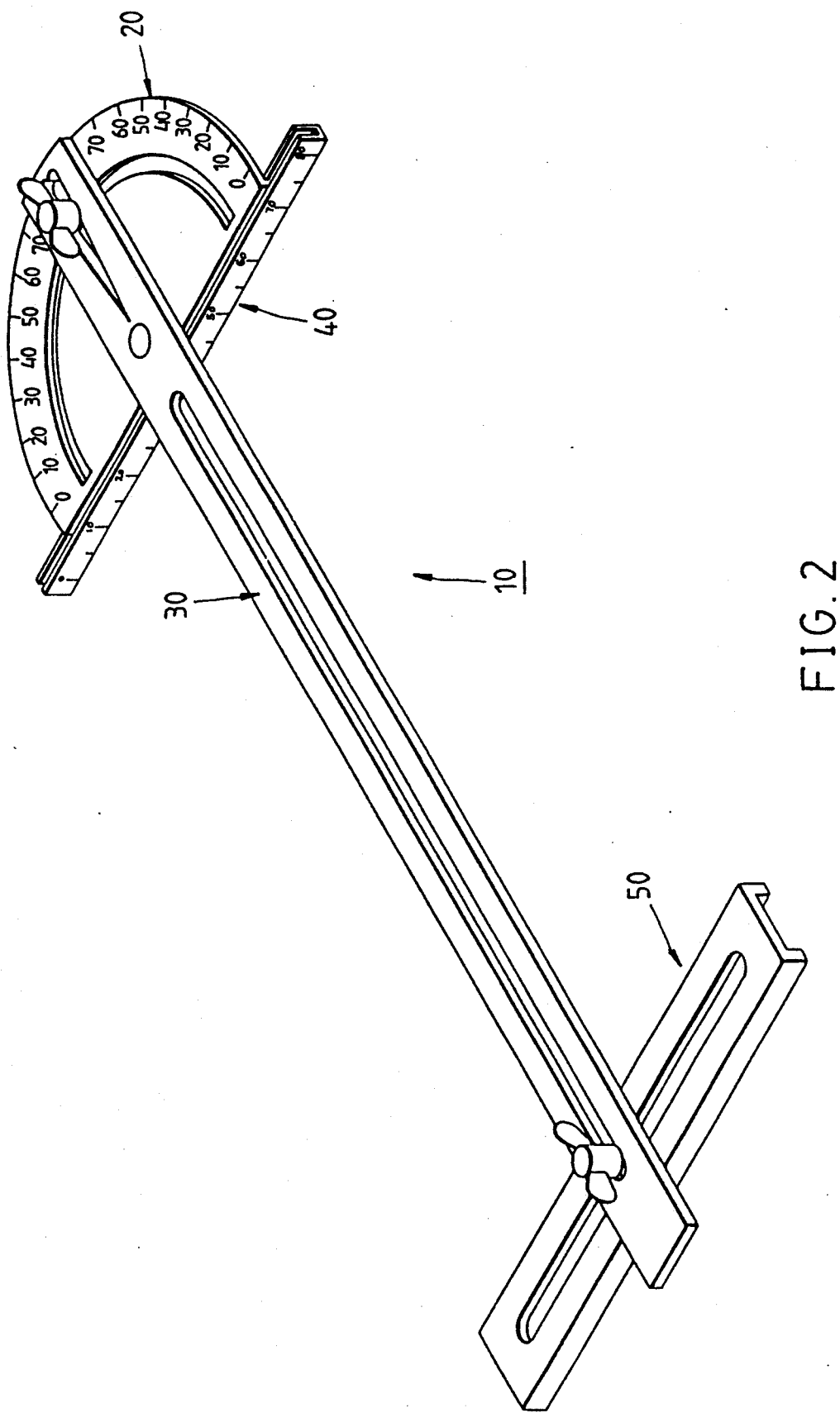
FIG. 2 shows a three-dimensional view of the assembled household tile cutting gauge of the first preferred embodiment of the present invention.
Figure 3:
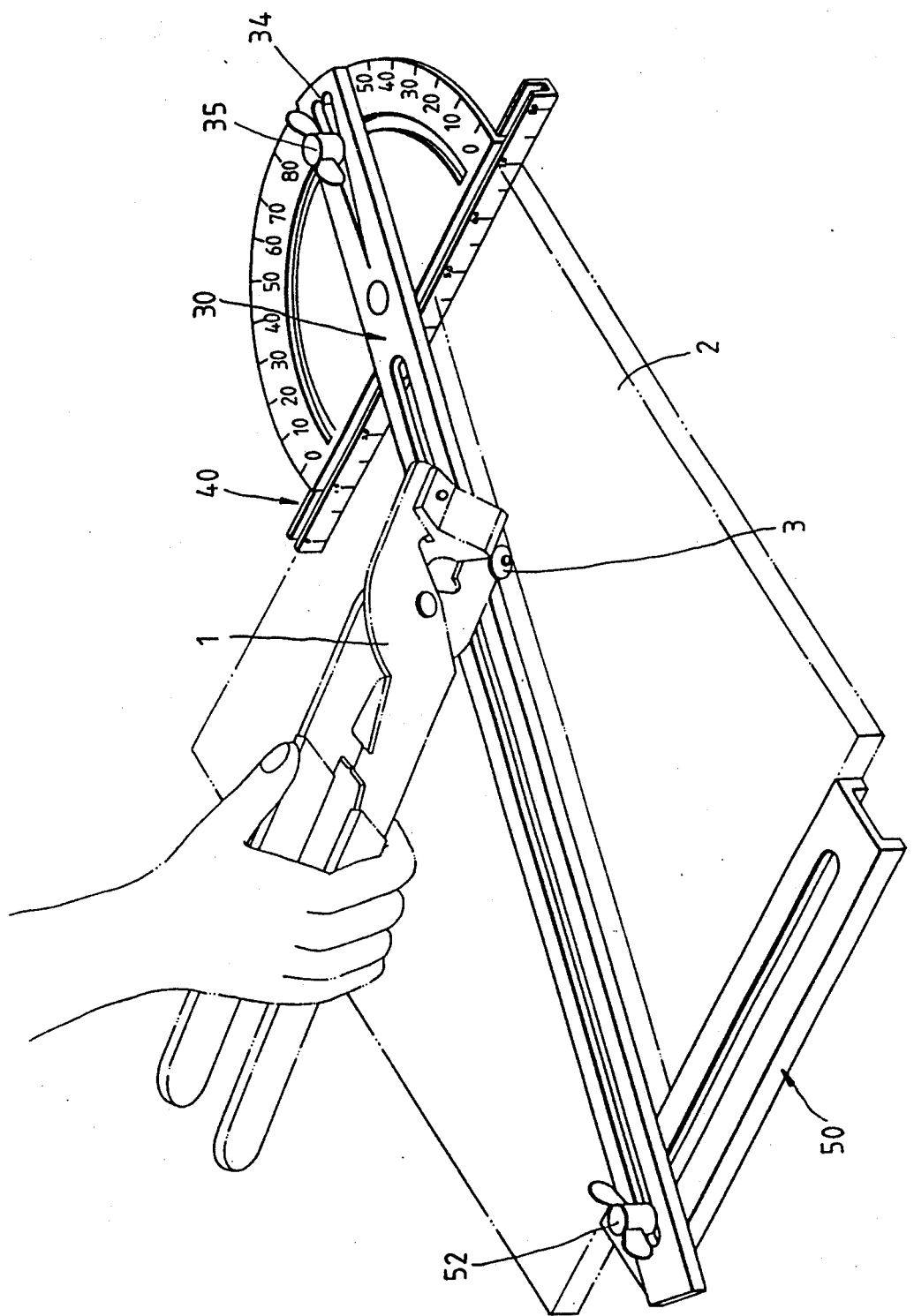
FIG. 3 shows a schematic view of the household tile cutting gauge of the present invention at work.

Referring to FIGS. 1-3, the household tile cutting gauge 10 embodied in the present invention is shown comprising a semi-circular protractor 20, a guide rod 30, a length ruler 40, and a baffle rod 50.

The semi-circular protractor 20 made of thin metal plate by means of punching and pressing is provided with the two sets of the angle marks 22 ranging from zero to ninety degrees arranged on the top surface 21 thereof, a 180-degree arcuate slot 23 disposed along the angle marks 22, and a straight side 24 of a predetermined depth extending downwardly.

The guide rod 30 of metal material is pivotally attached to the center of the top surface 21 of the semi-circular protractor 20 by means of a rivet 32 and is composed of a core hole 33 having a spike 34 located at the top end thereof and intended for use in pointing at the angle, and of a first lock bolt 35 passing through the arcuate slot 23 via the core hole 33 and having a first nut 36 attached to the bottom end thereof, and further of a first elongate hole 37 extending along the long axis thereof.

The length ruler 40 of plastic material is provided with a blade having a long slot 41 extending along the long axis thereof. The length ruler 40 is fitted over the straight side 24 of the semi-circular protractor 20 by means of its long slot 41 in such a manner that it is capable of sliding along the straight side 24. The length ruler 40 is further provided with a length mark 43 disposed on the outer side 42 thereof. The over-all length of the length ruler 42 is greater than that of the straight side 24 of the protractor 20. In addition, the height of the length ruler 40 is slightly greater than the thickness of the tile.

The baffle rod 50 is made of metal material by means of punching and pressing and is composed of a second elongate hole 51 extending along the long axis thereof and of a second lock bolt 52 having a second nut 53 screwed to the bottom end thereof and passing through the first elongate hole 37 of the guide rod 30 and the second elongate hole 51. The thickness of the baffle rod 50 is corresponding to the height of the length ruler 40.

In operation, the uncut tile 2 is arranged between the length ruler 40 and the baffle rod 50, as shown in FIG. 3. The length ruler 40 is then moved horizontally to the point of desired length, while the guide rod 30 is turned until its spike 34 points at the desired cutting angle. Finally, the baffle rod 50 is moved upwardly to press forcefully against the uncut tile 2, while the first lock bolt 35 and the second lock bolt 52 are respectively tightened so as to secure the uncut tile 2 in place. With the guiding of guide rod 30, the operator can make a cutting mark on the uncut tile 2 by means of a cutting wheel 3 of the tile cutting shears 1. The uncut tile 2 so marked is then removed to be cut along its cutting mark. The technique of cutting the tile is beyond the scope of the present invention and will not be therefore described here.

Figure 4:
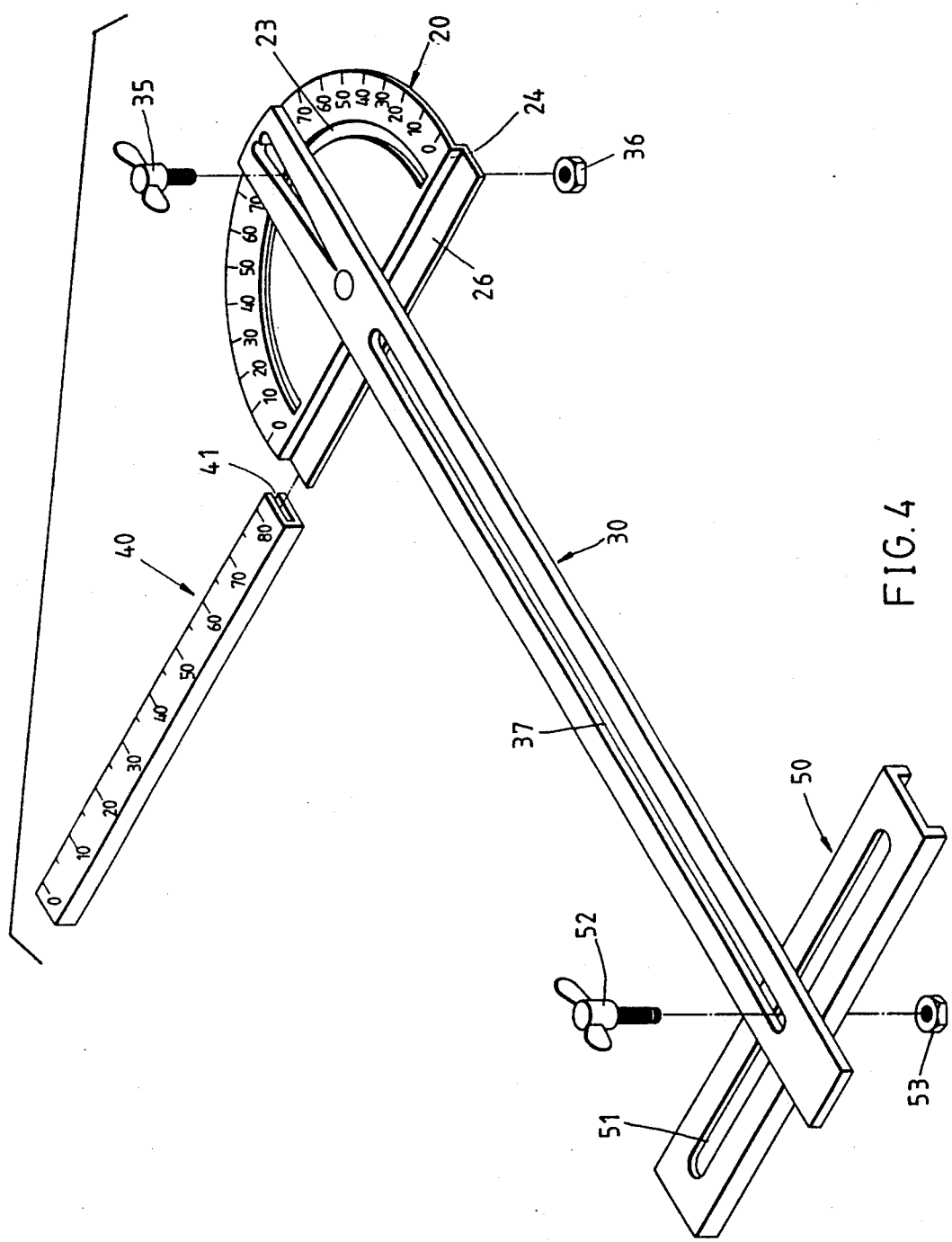
FIG. 4 shows an exploded view of the household tile cutting gauge of the second preferred embodiment of the present invention.
Figure 5:
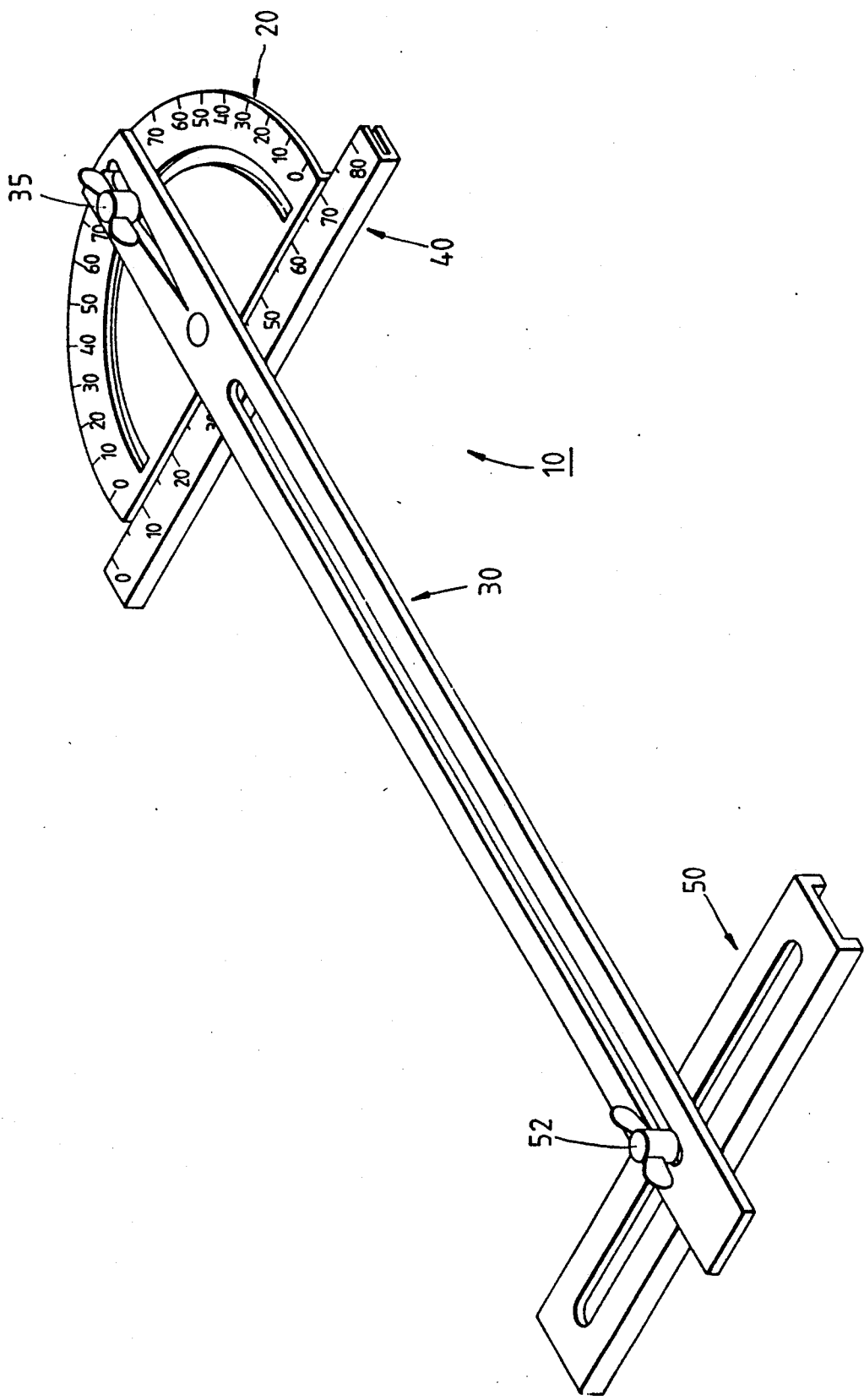
FIG. 5 shows a three-dimensional view of the assembled household tile cutting gauge of the second preferred embodiment of the present invention.

Now referring to FIGS. 4 and 5, the semi-circular protractor 20 is shown comprising a straight side 24 having an open horizontal side 26, which can be fitted into the long slot 41 of the length ruler 40.

The embodiments of the present invention described above are to be considered in all respects as merely illustrations of principles of the present invention. Accordingly, the present invention is to be limited only by the scope of the hereinafter appended claims.

What is claimed is:

1. A household tile cutting gauge comprising:

a semi-circular protractor having thereon an angle marking and a straight side;

a guide rod pivotally fastened to said semi-circular protractor having an angle indicating means for determining an angle between an axis of said guide and said straight side, said angle indicating means comprising a core hole at an end of said guide rod formed to provide a pointer to indicate said angle on said angle marking, said semi-circular protractor having an arcuate slot disposed along said angle marking, a first lock means extending through said arcuate slot and said guide rod, a length ruler slidably mounted on said straight side of said semi-circular protractor, a baffle means slidably engaged on said guide rod to move upward, downward, leftward and rightward for support of a tile placed in said gauge for cutting, said guide rod being provided with a first elongate slot disposed along the long axis thereof and with a second lock means extending through said first elongate slot to engage said baffle means, and said baffle means having a second elongate slot disposed along the long axis thereof to permit said second lock means to pass therethrough so as to fasten said baffle means to said guide rod.

2. A household tile cutting gauge according to claim 1, wherein said length ruler comprises a guide slot disposed along the long axis thereof, and wherein said straight side of said semi-circular protractor comprises a vertical side fitted into said guide slot of said length ruler.

3. A household tile cutting gauge according to claim 2, wherein said semi-circular protractor comprises a straight side having an open horizontal side fitted into said guide slot of said length ruler.

* * * * *